Jan. 15, 1935.  C. B. MATHEWS  1,987,941
FEED GRINDER
Filed Feb. 4, 1932  3 Sheets-Sheet 2

Inventor:
Clair B. Mathews
By
Wilson, Dowell, McCanna & Rehm
Attys.

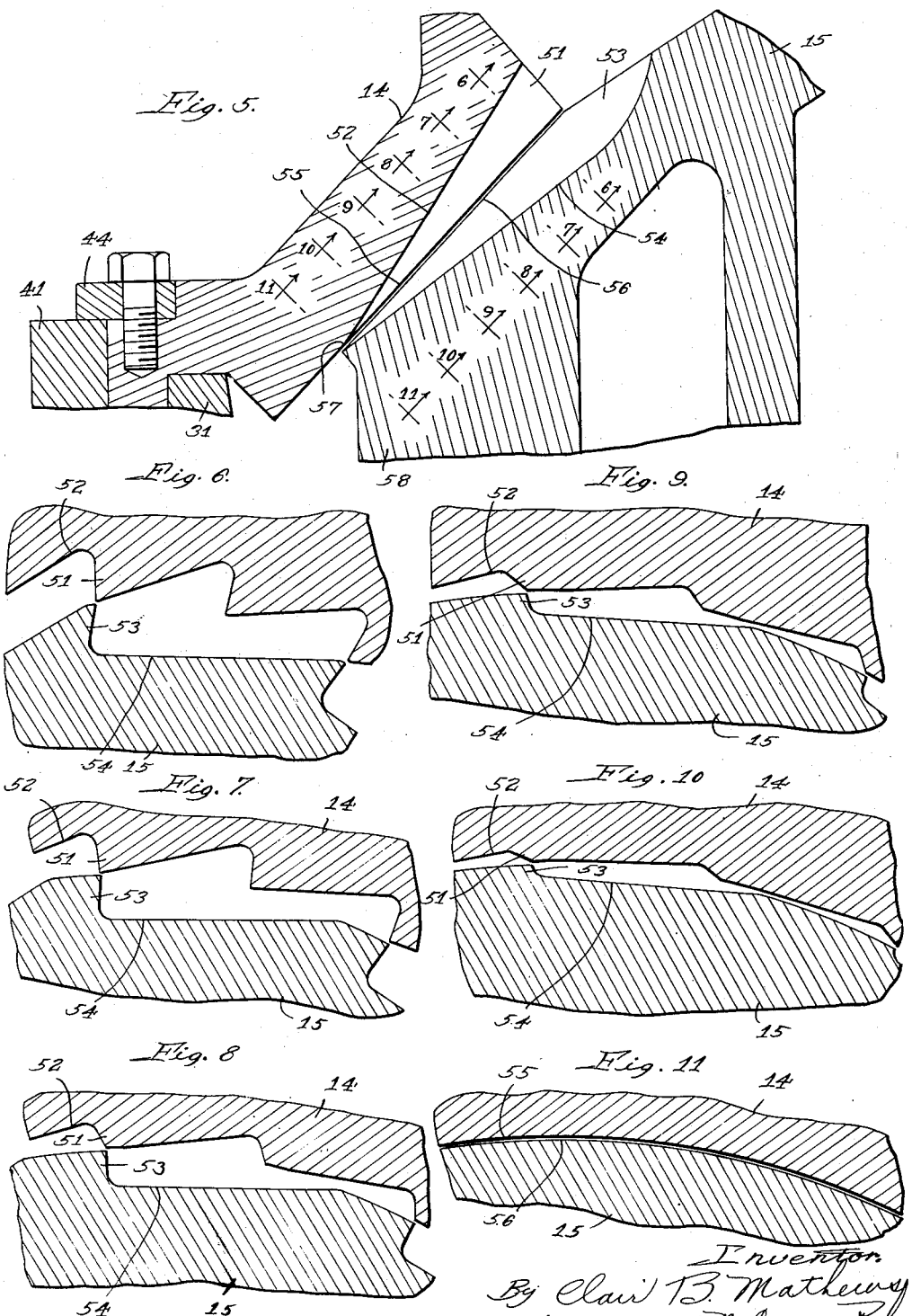

Patented Jan. 15, 1935

1,987,941

UNITED STATES PATENT OFFICE 1,987,941

FEED GRINDER

Clair B. Mathews, Beloit, Wis., assignor, by direct and mesne assignments, to Flakall Corporation, Beloit, Wis., a corporation of Delaware Application February 4, 1932, Serial No. 590,854

9 Claims. (Cl. 83—13)

This invention relates to a new and improved feed grinder.

The principal object of my invention is to provide a machine of simpler and more practical form than has been available in the past and one which by reason of its special construction and capacity for adjustment is adapted to produce either ground feed, flaked feed, or pulverized feed, whereby to meet any and all requirements.

The feed grinder of my invention in an intermediate adjustment produces flaked feed by virtue of a novel method of operation consisting in grinding the feed to a certain consistency and then rubbing the same between the inner rotating burr and the outer stationary burr just prior to discharge so as to form flakes. This flaking of the feed is of advantage because it avoids loss of a good percentage of material which otherwise is thrown off as dust, and gives a material which keeps better in storage by reason of the voids left between the flakes, such that there can be proper aeration, not to mention the important fact that flaked feed is more palatable and easily digested by the animal. An important factor in this method of operation is the heat of the parts between which the ground material is flaked, because the heat drives out moisture, causes contraction of the particles and improves the keeping quality of the meal produced, besides making for easier running of the machine.

The invention will be better understood as reference is made in the following specification to the following drawings, wherein—

Fig. 5 is an enlarged vertical sectional detail of the burrs, and

Figs. 6–11 are transverse sections on the correspondingly numbered lines of Fig. 5.

The same reference numerals are applied to corresponding parts throughout the views.

Figure 1:
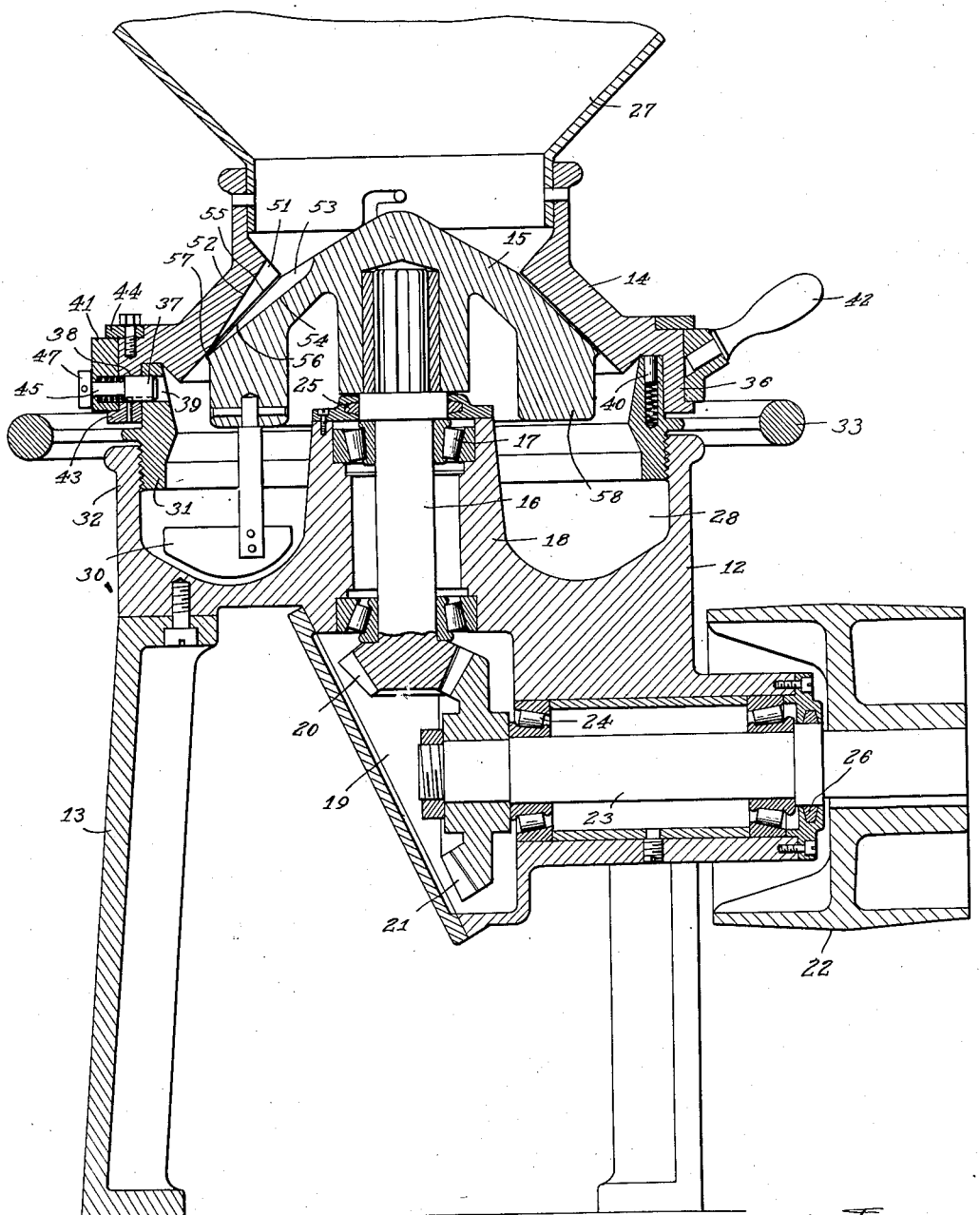
Figure 1 is a central vertical section through my improved feed grinder showing the upper portion in section on the broken line 1—1 of Fig. 2.
Figure 2:
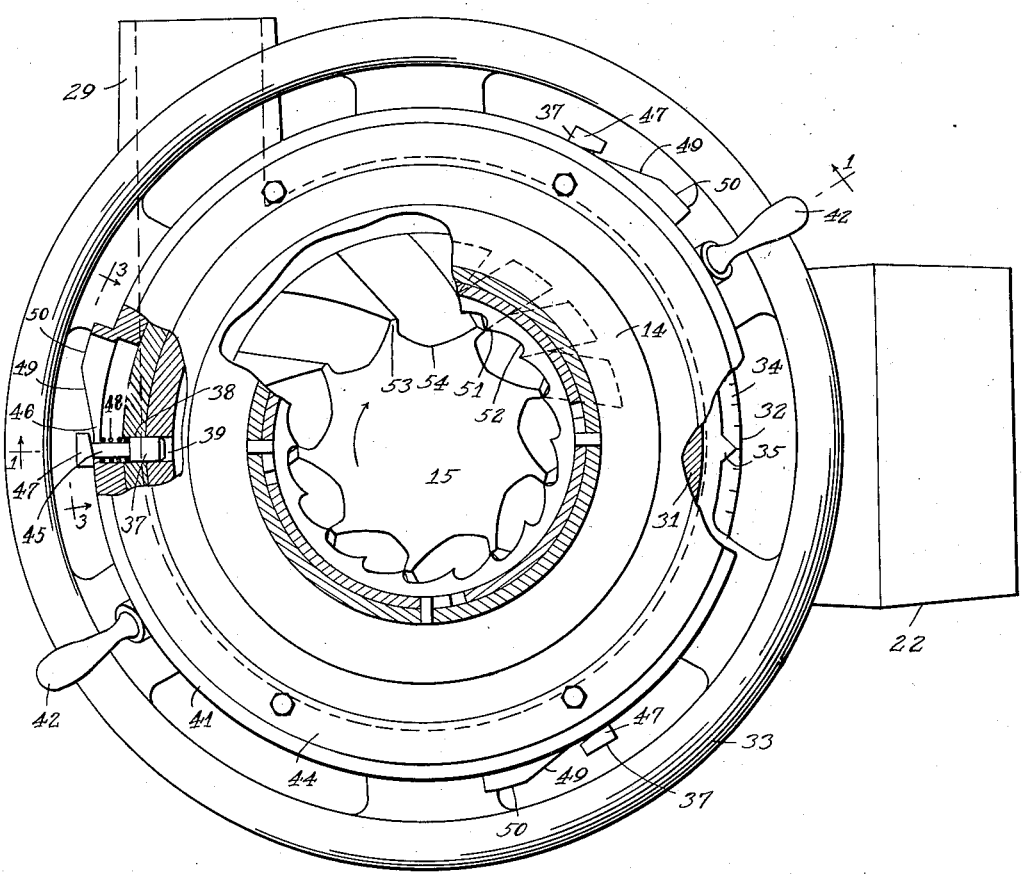
Fig. 2 is a plan view showing certain portions in section, broken away, for purposes of better illustration.
Figure 3:
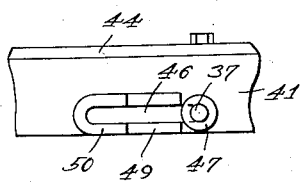
Fig. 3 is a fragmentary view taken on the line 3—3 of Fig. 2.

Referring first to Figs. 1 and 2, the reference numeral 12 is applied to the base of the feed grinder which is supported preferably on three legs 13. The base 12 supports the outer stationary burr 14 which is disposed like a bonnet over the rotary head 15 which constitutes the inner burr. The head 15 is mounted on the upper end of a spindle 16 received in bearings 17 in the center hub 18 provided in the base 12. In certain smaller sized machines, I contemplate mounting an electric motor on a vertical axis directly under the base 12 for direct drive of the spindle 16, but in the present case there is shown a housing 19 for the intermeshing bevel gears 20 and 21 to permit use of a drive pulley 22 on one side of the machine, the same being mounted on the shaft 23 received in bearings 24 provided therefor in the base 12. With this construction, if grease retainers are provided at 25 and 26, one filling of the machine with lubricant will last indefinitely and there is no danger of lubricant coming in contact with the material being ground. The feed or other material to be ground is dumped into the hopper 27 so that it comes down directly between the burrs 14—15 for grinding, flaking, or pulverizing, in the manner hereinafter fully described. The ground material drops down into an annular trough 28 provided in the base 12 about the hub 18, and it is discharged centrifugally from this trough through the outlet 29 under the action of fan blades 30, any suitable number of which are mounted on and depend from the head 15.

The clearance between the burrs 14—15, as will soon appear, determines whether the feed is ground, flaked, or pulverized. In most feed grinders there is nothing more than various degrees of fineness of grinding contemplated, that is, none provide for flaking, and the adjustments are as a rule uncertain and do not make for absolutely uniform clearance between the burrs. Furthermore, the clearance adjustments on the other mills are usually extremely complicated and not easy to operate. I have in the present case endeavored to avoid these objections by providing a single threaded adjustment consisting of a collar 31 carrying the burr bonnet 14 and threaded directly in the neck 32 formed on the base 12. A hand wheel 33 is formed preferably integral with the collar for turning the same manually, and if desired, a scale 34 may be provided on top of the neck 32 and a pointer 35 on the collar 31 to cooperate therewith so as to indicate at a glance the clearance adjustment. (See Fig. 2.) Since the collar 31 threads in the neck 32, it is obvious that the burr bonnet 14 will have a uniform clearance with respect to the burr head 15 in any position of adjustment, and, of course, the thread provided may be of any desired pitch according to the fineness of adjustments to be made. A single adjustment of this kind which can be made in a fraction of the time required with other adjustments with which I am familiar naturally means quite a saving in time for the operator. If desired, a set screw may be provided at some point on the collar 31 or wheel 33 accessible from outside the neck 32 arranged when tightened to lock the collar in adjusted position with respect to the neck.

Figure 4:
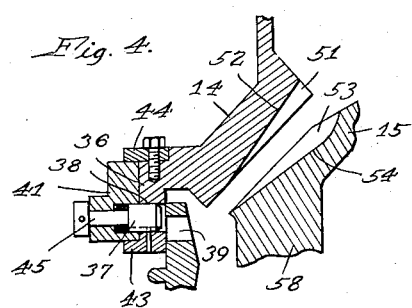
Fig. 4 is a fragmentary sectional detail corresponding to a portion of Figure 1 to show how the outer stationary burr is arranged to be removed when unlocked.

It is desirable to have the burr bonnet 14 quickly and easily removable for cleaning and to permit removal of anything that might get caught between the burrs. For example, nails and stones are apt to get in the feed and be thrown into the hopper, and quick removal of the burr bonnet in such an event will prevent damage to the machine. I contemplate providing a magnet in the lower end of the hopper to retrieve nails or other metallic particles before they have an opportunity to get between the burrs. To enable quick removal, the burr bonnet 14 has a downwardly projecting annular flange 36 fitting snugly over the top of the collar 31 and releasably locked thereon by means of a plurality of pins 37 slidable in radial holes 38 in the flange 36 and arranged to enter radial holes 39 provided therefor in the collar. A plurality of spring-pressed plungers 40 mounted in the top of the collar 31 and bearing against the bottom of the bonnet 14 tend normally to urge the bonnet upwardly to retracted position with relation to the head 15, and when the pins 37 are withdrawn from the holes 39 as shown in Fig. 4, the bonnet 14 is automatically raised under the action of these plungers. The locking pins 37, of which there are three, as shown in Fig. 2, are arranged to be simultaneously withdrawn from the holes 39 by the turning of a ring 41 by means of handles 42. The ring 41 is rotatably mounted on the outside of the flange 36 between an annular shoulder 43 provided at the bottom of the flange and a ring 44 bolted on the bonnet 14 and projecting from the top of the flange. The pins 37 have reduced shanks 45 projecting through elongated slots 46 in the ring 41 and have heads 47 provided on the projecting ends thereof. Springs 48 fitting about the shanks 45 between the ring 41 and the annular shoulder defined at the inner end of the reduced shanks tend normally to urge the pins inwardly toward locked position. Inclined cam surfaces 49 are formed on the outside of the ring 41 to serve by cooperation with the heads 47 to withdraw the pins 37 from the holes 39 against the action of the springs 48 when the ring 41 is turned in a counterclockwise direction (see Fig. 2). A dwell 50 is formed at the end of each of the cam surfaces 49 onto which the head end of each locking pin will ride when the pins are all fully retracted. When the pins are retracted the bonnet 14, as previously stated, is raised abruptly under the action of the spring-pressed plungers 40 and then the bonnet can be removed by means of the handles 42. In replacing the bonnet, it is first dropped down over the top of the collar 31 and then the ring 41 is turned so as to release the locking pins 37 for entry into the holes 39 under action of the springs 48. The bonnet is locked by simply bearing down on it to overcome the action of the plungers 40 and then turning the bonnet one way or the other enough to bring the locking pins into register with the holes 39, whereupon the pins immediately enter under action of their springs.

Referring now to Fig. 5, the stationary burr bonnet 14 has teeth 51 provided on the inside thereof by the cutting or molding of grooves 52 therein, and the rotary burr head 15 has teeth 53 for cooperation with the teeth 51 provided on the outside thereof by the cutting or molding of grooves 54 therein. The inside surface 55 of the bonnet and the outside surface 56 of the head it will be noticed have a uniform clearance from top to bottom, and are disposed at an angle of approximately 45° with respect to a vertical. By virtue of this uniform clearance from top to bottom, it is manifest that the particles of grain or other material being ground are forced to travel in the grooves between the teeth, and the farther down they get, the more finely they become ground because of the decreasing depth of the grooves. Gravity is one factor in assisting the passage of the material through the grinder, the hopper being directly over the grinding parts. Another factor is the centrifugal force which tends to crowd the material toward the outer ends of the grooves, the head 15 being operated at a high speed so that centrifugal force becomes an appreciable factor. Still another factor is the augering action secured by virtue of the approximately 30° angle of the grooves 54 in the head with respect to a radius, the grooves 54 being inclined in one direction, forwardly with relation to the direction of rotation, and the grooves 52 being inclined preferably at the same angle as the grooves 54, but in the opposite direction, namely, rearwardly with relation to the direction of rotation. See Fig. 2, in which the direction of rotation is indicated by an arrow. In this figure, as well as in Figs. 6–11, it is evident that there are twice as many grooves in the burr bonnet 14 as in the burr head 15. This makes for more efficient operation. It will now be observed that aside from decreasing depth of the grooves from top to bottom, which appears in the sections Figs. 6–10, there is a change in the shape of the teeth 51 and 53. In Fig. 6, showing a section through the upper end, the teeth are shown to have sharply defined edges for shearing purposes. This sharpness of the edges is maintained down to the plane of the line 7—7 (Fig. 7), but it will be noticed in Fig. 8 that the shoulders defining the teeth 51 are no longer square but obtuse in cross-section, and the included angle thereof becomes greater and greater farther down, as appears in Figs. 9 and 10. In other words, as the groove gets shallower, the tooth defined thereby becomes less pronounced, and, as shown, beyond the lower end of the groove there is a plain annular surface 55 (see Fig. 11). The shoulder defining each tooth 53 also becomes obtuse in cross-section at about the plane of the line 9—9 (Fig. 9) and the included angle thereof increases the farther down one goes until at the end of the grooves 54 a plain circular edge is presented. Manifestly, the form of the teeth 51 and 53 determines the operation of the grinder, and it is obvious from examination of Figs. 6–11 that in the passage of the grain or other material down between the teeth, it will be cut or "cracked" in its passage down to or slightly past the plane of the line 7—7 (Fig. 7), but beyond that point the action becomes more that of grinding or crushing, that is, if the bonnet 14 is disposed in the proper relation to the head 15. For example, if it is desired to "crack" corn, a clearance of one-fourth of an inch would be used, and one-eighth of an inch for cracking wheat. On the other hand, if a grain is to be pulverized, a clearance of less than one-sixtyfourth of an inch would be used. Intermediate clearances of say one-sixty-fourth of an inch to one-thirty-second produces flaked grain, a product which so far as I am aware has not been possible to produce heretofore. The flaking obtained with an intermediate degree of clearance is attributable to the fact that the grooves 52 for the outer teeth 51 terminate above the lower end of the grooves 54 for the inner teeth 53, so that after the material is cut and ground in its passage between the teeth to the lower end of the grooves 52, and while it is passing from the lower ends of the grooves 54, it is subjected to a rubbing or abrasive action on the plain smooth inside surface of the bonnet 14 designated by the numeral 57. As a result of this rubbing action, any fine particles, so fine that they would otherwise be apt to blow away as dust, are compressed into a sort of annular wick formed by the coarser particles, which, upon emerging from between the grinding parts, breaks up into flakes sometimes as large as a half dollar. This form of feed has many advantages. First of all, there is the fact that the fine particles which would otherwise be lost are saved by being compacted or compressed with the coarser particles, thus avoiding a serious loss. Such a loss is objectionable not only from the standpoint of the cost of the material itself which cannot be recovered, but from the standpoint of the comfort of the operator who otherwise is forced to inhale this fine material while attending the machine, and, furthermore, from the standpoint that the fine dust collecting on the belt and pulleys resulted in slippage and loss of power. Other important advantages of the flaked feed are that it is more palatable and easily digested by the animal and can be kept in bins without danger of mildew, owing to the fact that the flakes create voids and permit good aeration of the material.

In the above discussion of the flaking operation, only the mechanical phases were discussed, but I have found that heat is a very important factor in the production of the flaked feed. The machine is designed to run warm, but if necessary electrical heating means may be provided on the bonnet, or on the head, or both, to secure the desired temperature. The heat of friction developed in the grinding of feed has, however, been found sufficient to secure the desired results. The heating is not to the point of scorching, but just enough to take away a certain amount of moisture from the particles and give a sort of glaze to the flakes produced, which has been found to improve the keeping quality. The heating, aside from taking away moisture, results in a certain contraction of the particles and makes for easy running of the machine. The machine has been designed with a view to retaining heat in the bonnet 14 and head 15, as evidenced by the heavy cross-section of these parts as appears in Figure 1. A flywheel rim 58 provided on the head 15 is principally for smooth running, but also serves to retain heat where it is most needed, namely, adjacent the surface 57 on the bonnet.

It is believed the foregoing description conveys a good understanding of the objects and advantages of my invention. While it might be assumed from the description that the machine is intended only for feed grinding, it should be understood that food for human consumption can be and has been produced with it. The appended claims have been drawn so as to cover all legitimate modifications and adaptations.

I claim:

1. In a grinding mill, the combination of an inner rotatable burr head, and an outer stationary burr bonnet, said head having grooves provided therein defining teeth therebetween, said bonnet also having grooves provided therein defining teeth therebetween for cooperation with the teeth on said head, the head and bonnet having their outer and inner surfaces respectively disposed with a substantially uniform clearance therebetween from end to end of the teeth, the grooves in the head and bonnet gradually decreasing in depth from the entrance end of the teeth to the discharge end of the teeth and terminating at the discharge end in an annular flaking orifice, and means for setting said head and bonnet in fixed spaced relationship and for adjusting said relationship to cause the material to be flaked by forced delivery through said fixed orifice 2. In a grinding mill, the combination of an inner rotatable burr head held against displacement longitudinally of its axis, and an outer stationary burr bonnet, said head having grooves provided therein defining teeth therebetween, said bonnet also having grooves provided therein defining teeth therebetween for cooperation with the teeth on said head, the head and bonnet having their outer and inner surfaces respectively disposed with a substantially uniform clearance therebetween from end to end of the teeth, and the grooves in the head and bonnet gradually decreasing in depth from the entrance end of the teeth to the discharge end of the teeth and terminating at the discharge end of the teeth, the grooves in the bonnet as well as the teeth thereof terminating short of the discharge end of the grooves in the head and the teeth thereof, whereby to present a plain smooth flaking surface on the inside of said bonnet, at the discharge end, said surface providing one wall of a uniform annular flaking orifice adjacent the lower end portions of the teeth and grooves in said head, and means for setting said head and bonnet in predetermined spaced relationship to cause the material to be flaked by forced delivery through said fixed orifice.

3. In a grinding mill, the combination of an inner and an outer burr member, said members being mounted for relative rotation, grinding teeth provided on said members for grinding material down to a certain predetermined fineness in the passage of said material from one end to the other of said teeth, a flaking surface on at least one of said members beyond the grinding teeth thereof and forming with the other member a fixed annular flaking orifice, and means for maintaining said members in fixed spaced relationship to effect flaking of materials.

4. In a grinding mill, the combination of an inner burr member and an outer burr, one of said members being stationary and the other rotatable, the inner burr member having an annular grinding surface disposed in parallelism with an annular grinding surface on the outer member, the inner member having cutting and grinding teeth provided thereon with their working edges in the plane of the annular grinding surface and having grooves provided between said teeth of a predetermined depth at the entrance end thereof but tapering to a point of no depth at the discharge end of the annular grinding surface on said inside member, the outside member also having cutting and grinding teeth provided thereon with their working edges in the plane of the annular grinding surface of said outside member, said member having grooves provided therein between the teeth of a predetermined depth at the entrance end thereof but tapering to a point of no depth short of the discharge end of the grooves and teeth in the inner member, said inner and outer burr members providing an annular flaking orifice at the lower end of the teeth, and means for maintaining said members in fixed spaced relationship to effect flaking of materials.

5. A grinding mill as set forth in claim 4 wherein the outer burr member is stationary and the inner burr member is rotatable, the outer burr member being of heavy cross-section at least in the portion behind the smooth grinding surface immediately beyond the teeth and grooves in the outer burr member, whereby to retain heat in said portion, and the inner burr member having an annular rim portion of enlarged cross-section to serve both as a flywheel rim and to retain heat in the lower portion of said member adjacent the lower ends of the teeth and grooves in said inner burr member.

6. In a feed grinder, the combination of a base, a burr head rotatably mounted on said base, a burr bonnet stationarily mounted on said base over the marginal portion of said head, there being cutting and grinding teeth in the marginal portion of said head and cutting and grinding teeth on the inside of said bonnet for cooperation therewith, a ring threadedly mounted on the base concentrically with respect to the head, the bonnet being supported on said ring for adjustment of its clearance with respect to the head, turning of said ring serving to uniformly adjust the clearance relationship of the bonnet with respect to the head, and means for detachably locking the bonnet on the ring whereby to permit removal and replacement of the bonnet without changing the clearance adjustment.

7. A feed grinder as set forth in claim 6 including a hand wheel rigid with respect to the ring and projecting annularly about the bonnet for convenient manipulation.

8. A feed grinder as set forth in claim 6 including a hand wheel rigid with respect to the ring and projecting annularly about the bonnet for convenient manipulation, and means for indicating the position of adjustment of the ring with respect to the base in terms of clearance between the bonnet and head.

9. A feed grinder as set forth in claim 6 including spring means tending normally to urge the bonnet upwardly from the ring to abnormal clearance with respect to the head, whereby the bonnet is automatically moved to retracted position with respect to the head when unlocked from the ring.

CLAIR B. MATHEWS.